(12) United States Patent
Wan et al.

(10) Patent No.: US 9,083,905 B2
(45) Date of Patent: Jul. 14, 2015

(54) STRUCTURED LIGHT IMAGING SYSTEM (75) Inventors: Chung Chun Wan, Fremont, CA (US);
Xiangli Li, San Jose, CA (US);
Gennadiy Agranov, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 725 days.

(21) Appl. No.: 13/353,593

(22) Filed: Jan. 19, 2012

(65) Prior Publication Data

US 2012/0274744 A1 Nov. 1, 2012

Related U.S. Application Data (60) Provisional application No. 61/479,029, filed on Apr. 26, 2011.

(51) Int. Cl.
| H04N 5/235 | (2006.01) |
| H04N 9/73 | (2006.01) |
| G03B 7/00 | (2014.01) |
| H04N 5/3745 | (2011.01) |
| G01S 17/10 | (2006.01) |
| G01S 17/89 | (2006.01) |

(52) U.S. Cl.
CPC ............ H04N 5/37452 (2013.01); G01S 17/10 (2013.01); G01S 17/89 (2013.01)

(58) Field of Classification Search
None
See application file for complete search history.

(56) References Cited

U.S. PATENT DOCUMENTS

| 2004/0021057 | A1* | 2/2004 | Drowley .................... 250/208.1 |
| 2005/0134724 | A1* | 6/2005 | Uenaka ......................... 348/370 |
| 2008/0079833 | A1* | 4/2008 | Ichikawa et al. .............. 348/311 |
| 2008/0231737 | A1* | 9/2008 | Weale et al. .................. 348/308 |
| 2008/0285056 | A1 | 11/2008 | Blayvas |
| 2011/0037969 | A1* | 2/2011 | Spickermann et al. ...... 356/5.01 |
| 2011/0085043 | A1* | 4/2011 | Kamiyama ................... 348/164 |
| 2011/0310125 | A1* | 12/2011 | McEldowney et al. ....... 345/660 |
| 2012/0087573 | A1* | 4/2012 | Sharma et al. ................ 382/154 |

OTHER PUBLICATIONS

Oggier, Thierry, "Image Sensor Technologies for 3D Time-of-Flight Range Imaging", Mesa Imaging, Bergen (2009), 10 pgs.

* cited by examiner

Primary Examiner — Aung S Moe
Assistant Examiner — Euel Cowan
(74) Attorney, Agent, or Firm — Kendall P. Woodruff

(57) ABSTRACT

Structured light imaging method and systems are described. An imaging method generates a stream of light pulses, converts the stream after reflection by a scene to charge, stores charge converted during the light pulses to a first storage element, and stores charge converted between light pulses to a second storage element. A structured light image system includes an illumination source that generates a stream of light pulses and an image sensor. The image sensor includes a photodiode, first and second storage elements, first and second switches, and a controller that synchronizes the image sensor to the illumination source and actuates the first and second switches to couple the first storage element to the photodiode to store charge converted during the light pulses and to couple the second storage element to the photodiode to store charge converted between the light pulses.

17 Claims, 9 Drawing Sheets

PULSED STRUCTURED LIGHT 3D IMAGING SYSTEM

PIXEL WITH N STORAGE ELEMENTS

180# STRUCTURED LIGHT IMAGING SYSTEM

CROSS REFERENCE TO RELATED APPLICATIONS

This application claims priority of U.S. Provisional Patent Application Ser. No. 61/479,029, filed Apr. 26, 2011, which is incorporated fully herein by reference.

FIELD

The present invention is directed to imaging systems and, more particularly, structured light imaging systems.

BACKGROUND

Structured light imaging systems are commonly used for three-dimensional (3D) imaging. A structured light imaging system has two main parts: an illumination source and a sensing device including an array of pixels. The illumination source projects one or more light patterns onto an object being imaged and the pixels within the sensing device detect light reflected by the object. The detected light is then processed by the sensing device to generate a representation of the object.

Figure 1:
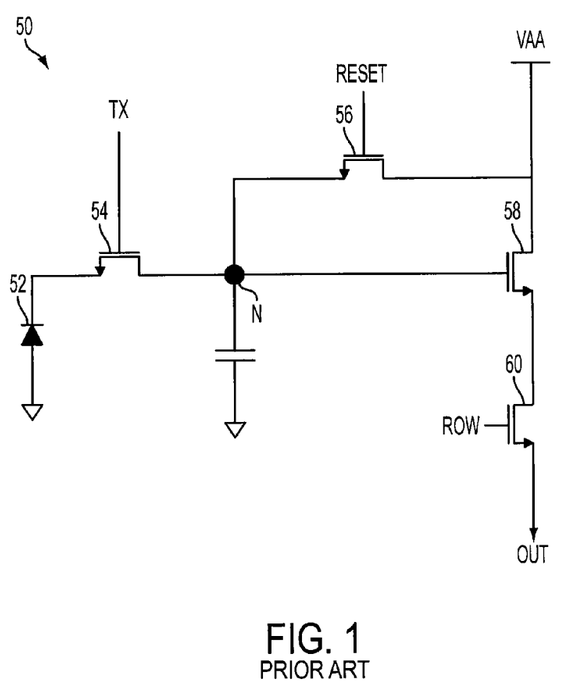
FIG. 1 is a circuit diagram illustrating a prior art four transistor pixel for use in a pixel array of an imaging device.

FIG. 1 illustrates a typical four transistor (4T) pixel 50 utilized in a pixel array of an sensing device, such as a complementary metal-oxide-semiconductor (CMOS) sensing device. The pixel 50 includes a photosensor 52 (e.g., a photodiode), a storage node N configured as a floating diffusion (FD) region, transfer transistor 54, reset transistor 56, charge conversion transistor 58 configured as a source follower transistor, and row select transistor 60. The photosensor 52 is connected to the storage node N by the transfer transistor 54 when the transfer transistor 54 is activated by a transfer control signal TX. The reset transistor 56 is connected between the storage node N and an array pixel supply voltage VAA. A reset control signal RESET is used to activate the reset transistor 56, which resets the storage node N to a known state.

The charge conversion transistor 58 has its gate connected to the storage node N and is connected between the array pixel supply voltage VAA and the row select transistor 60. The charge conversion transistor 58 converts the charge stored at the storage node N into an electrical output signal. The row select transistor 60 is controllable by a row select signal ROW for selectively outputting the output signal OUT from the charge conversion transistor 58. For each pixel 50, two output signals are conventionally generated, one being a reset signal Vrst generated after the storage node N is reset, the other being an image or photo signal Vsig generated after charges are transferred from the photosensor 52 to the storage node N.

Figure 2:
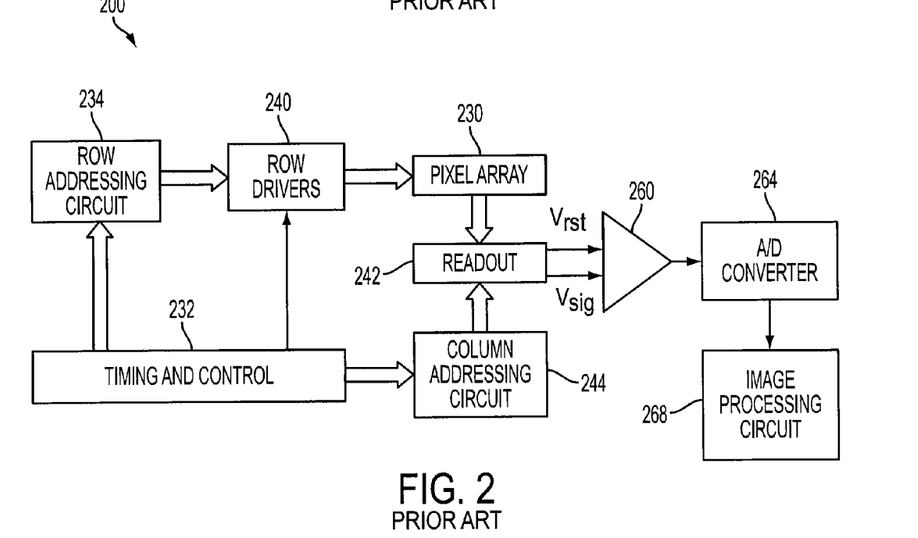
FIG. 2 is a block diagram of a prior art imaging device.

FIG. 2 illustrates a sensing device 200 that includes an array 230 of pixels (such as the pixel 50 illustrated in FIG. 1) and a timing and control circuit 232. The timing and control circuit 232 provides timing and control signals for enabling the reading out of signals from pixels of the pixel array 230 in a manner commonly known to those skilled in the art. The pixel array 230 has dimensions of M rows by N columns of pixels, with the size of the pixel array 230 depending on its application.

Signals from the sensing device 200 are typically read out a row at a time using a column parallel readout architecture. The timing and control circuit 232 selects a particular row of pixels in the pixel array 230 by controlling the operation of a row addressing circuit 234 and row drivers 240. Signals stored in the selected row of pixels are provided to a readout circuit 242 in the manner described above. The signals are read twice from each of the columns and then read out sequentially or in parallel using a column addressing circuit 244. The pixel signals (Vrst, Vsig) corresponding to the reset pixel signal and image pixel signal are provided as outputs of the readout circuit 242, and are typically subtracted by a differential amplifier 260 in a correlated double sampling operation and the result digitized by an analog to digital converter 264 to provide a digital pixel signal. The digital pixel signals represent an image captured by pixel array 230. The digital pixel signals are processed in an image processing circuit 268 to produce an output image.

SUMMARY OF THE INVENTION

An imaging method in accordance with one embodiment generates a stream of light pulses, converts the stream after reflection by a scene to charge, stores charge converted during the light pulses to a first storage element, and stores charge converted between light pulses to a second storage element. A structured light imaging system in accordance with one embodiment includes an illumination source that generates a stream of light pulses and an image sensor. The image sensor includes a photodiode, first and second storage elements, first and second switches, and a controller that synchronizes the image sensor to the illumination source and actuates the first and second switches to couple the first storage element to the photodiode to store charge converted during the light pulses and to couple the second storage element to the photodiode to store charge converted between the light pulses.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION

Figure 3A:
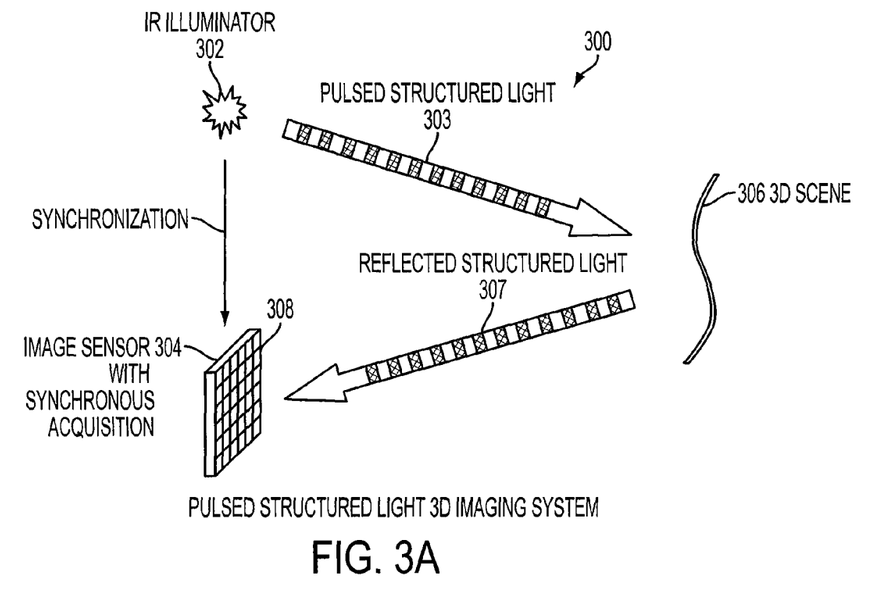
FIG. 3A is an illustration representing the generation, reflection, and capture of structured light in accordance with an aspect of the present invention.

FIG. 3A depicts an imaging system 300 in accordance with an embodiment of the present invention. Systems in accordance with aspects of the present invention are able to capture depth information of a scene using an improved structured light approach. The depicted imaging system 300 includes an illumination source 302 and a sensing device 304 synchronized with the illumination source 302. The illustrated illumination source 302 is an infrared (IR) illumination source that generates structured light; however, other spectrums of light such as visible light may be employed. Suitable illumination sources for use with the present invention will be understood by one of skill in the art from the description herein.

In accordance with one use, the imaging system 300 generates a 3D representation of an object/3D scene 306. The illumination source 302 generates pulsed structured light 303, which is directed toward the object 306. The object reflects portions of the pulsed structured light 303 as reflected structured light 307. The sensing device 304, which is in sync with the illumination source 302, captures the reflected light 307 and generates a 3D representation of the object. The illustrated sensing device 304 includes an array of pixels 308 and each pixel includes multiple storage elements, which are discussed in further detail below. Through the use of multiple storage elements, the present invention facilitates the capture and storage of rapidly changing scenes.

Figure 3B:
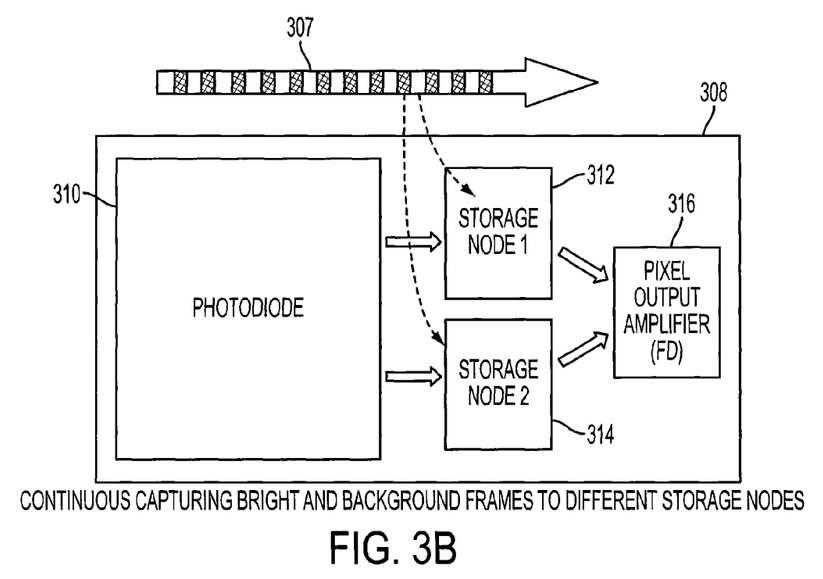
FIG. 3B is a block diagram of a multiple storage node pixel in accordance with an aspect of the present invention.

FIG. 3B depicts a pixel 308 in accordance with an aspect of the present invention. The illustrated pixel 308 includes a photodiode 310 for converting light impinging on the photodiode to charge. The illustrated pixel 308 also includes two storage elements, a first storage node 312 and a second storage note 314, for storing charge converted by the photodiode 310. In contrast to conventional structured light systems, the illumination source 302 illustrated in FIG. 3A emits pulses of structured light 303. As depicted in FIG. 3B, the pixels 308, being synchronized to the illumination source 302, are able to continuously capture reflected pulses of structured light 307—with the bright frames 307a (light pulses) stored in one storage element 312 while the background frames 307b (between light pulses) are stored in another storage element 314. Interleaving the bright and background frames in time strongly suppresses any degradation in depth resolution due to varying ambient lighting conditions. The time-interleaved frames acquired by the pixel 308 can be subtracted, e.g., either at the pixel or column level, upon read out in the analog domain to further improve performance. The charge stored in the storage elements 312/314 may be combined in a floating diffusion region of a pixel output amplifier 316, which will be described in further detail below.

Figure 4A:
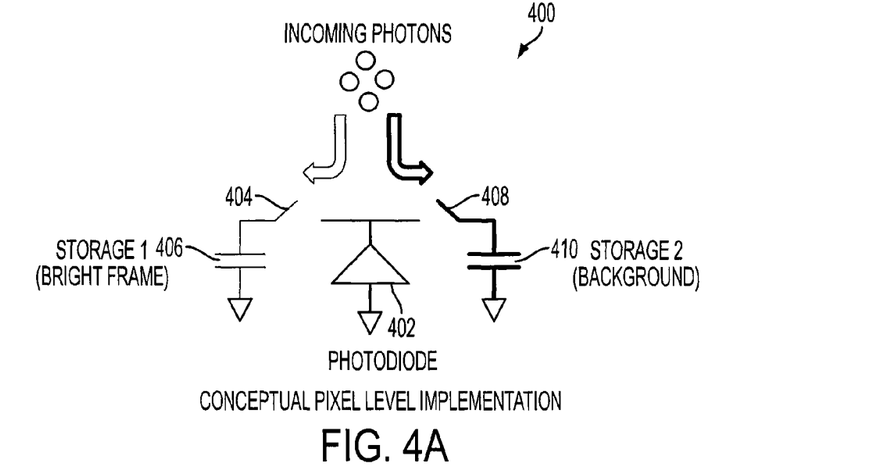
FIG. 4A is an illustration partly in circuit diagram form of a two storage node pixel in accordance with an aspect of the present invention.

FIG. 4A is a conceptual diagram depicted operation of a pixel 400 in accordance with an example of the present invention. The illustrated pixel 400 includes a photodiode 402, a first switch 404 that selectively connects the photodiode 402 to a first storage element 406 (e.g., to store charge developed by the photodiode 402 during one or more light pulses), and a second switch 408 that selectively connects the photodiode 402 to a second storage element 410 (e.g., to store charge developed by the photodiode 402 between one or more light pulses). Being synchronized with the illumination source 302 (FIG. 3A), the two switches 404/408 of the pixel 400 are controlled to transfer photo-generated charges to the appropriate storage regions 406/410 where the new charges are added to the charges that were previously stored.

In one embodiment, charge is accumulated in the photodiode 402 and then transferred to a storage element 406/410 (see, for example, FIGS. 7A and 7B and the related description below). In another embodiment, photo-generated charge is directly streamed and accumulated in a storage region 406/410 (see, for example, FIGS. 8A and 8B and the related description below). Pixel 400 may be synchronized and the switches 404/408 may be actuated under control of a conventional timing and control circuit such as timing and control circuit 232 depicted in FIG. 2. Suitable modifications to timing and control circuit 232 for use with pixel 400 and other pixels described herein will be understood by one of skill in the art from the description herein.

Figure 4B:
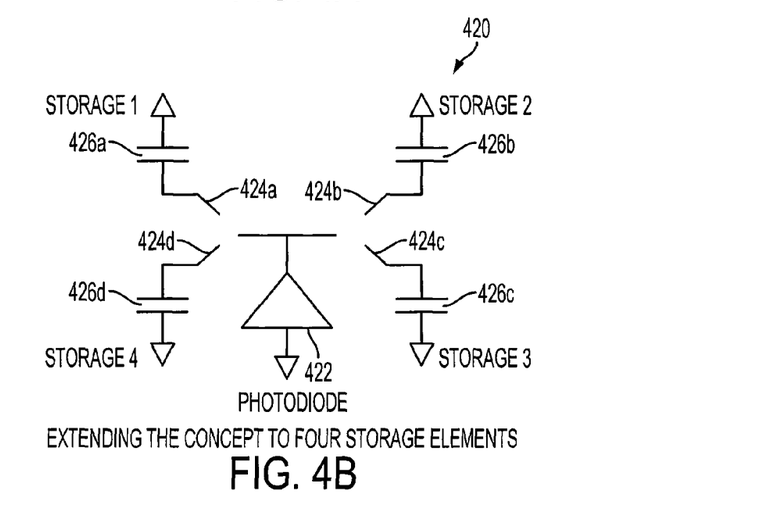
FIG. 4B is an illustration partly in circuit diagram form of a four storage node pixel in accordance with an aspect of the present invention.
Figure 5:
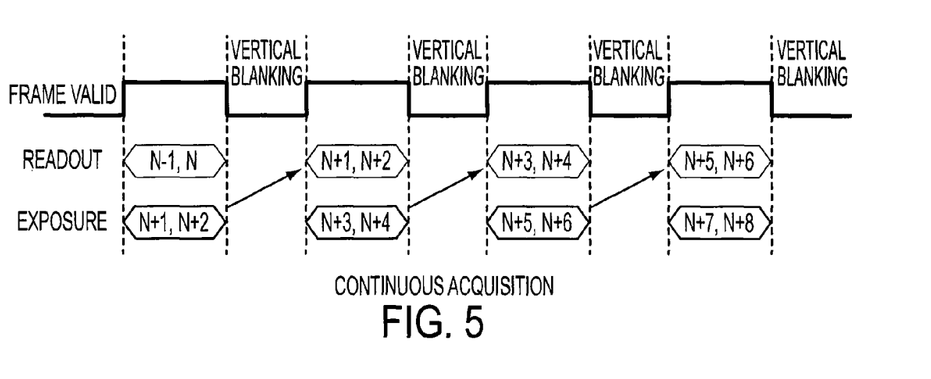
FIG. 5 is a timing diagram illustrating exposure and readout for a four storage node pixel in accordance with an aspect of the present invention.

FIG. 4B is a conceptual diagram depicting operation of another pixel 420 in accordance with an example of the present invention that enables projection and capture of multiple patterns, e.g., for more accurate depth measurement results. The illustrated pixel 420 includes a photodiode 422 and four switches 424a-d that selectively connect the photodiode 422 to four respective storage elements 426a-d. By utilizing a pixel 420 with four storage elements 426 as shown in FIG. 4B, three patterns projected by an illumination source and the background can all be captured in an exposure. In another embodiment, if one pattern is used, continuous acquisition can be performed in which readout and exposure are pipelined as shown in FIG. 5.

Figure 6:
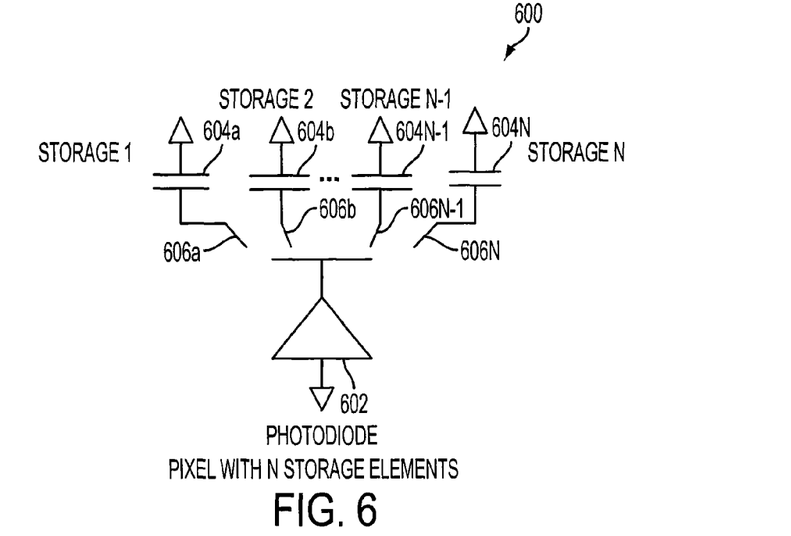
FIG. 6 is an illustration partly in circuit diagram form of a N storage node pixel in accordance with an aspect of the present invention.

FIG. 6 is a conceptual diagram depicting another pixel 600 having a photodiode 602 and N storage elements 604a-N that can be selectively coupled to the photodiode 602 through N switches 606a-N. In accordance with this embodiment, N−1 projected patterns and the background can be captured. Further, since all the frames are interleaved in time, any degradation in depth resolution due to varying ambient lighting conditions is suppressed.

Figure 7A:
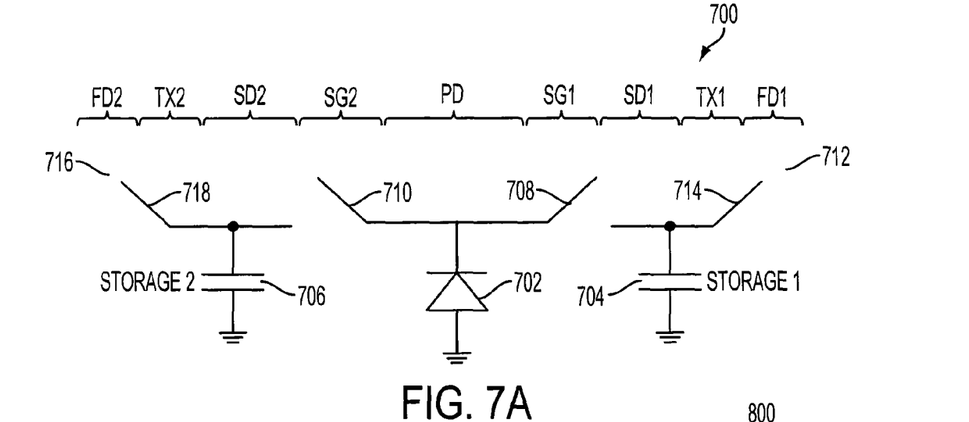
FIG. 7A is a circuit diagram of a two storage node pixel in accordance with an aspect of the present invention.

FIG. 7A depicts a conceptual circuit diagram of a pixel 700 along with descriptive regions associated with semiconductor fabrication in accordance with aspects of the present invention. The pixel 700 includes a photodiode (PD) 702. The pixel 700 also includes a first storage device/element (SD1) 704 and a second storage device/element (SD2) 706. The first storage element 704 is selectively coupled to the photodiode 702 through a first storage gate (SG1) 708 and the second storage element 706 is selectively coupled to the photodiode 702 through a second storage gate (SG2) 710. Additionally, the first storage element 704 is selectively coupled to a first floating diffusion region (FD1) 712 through a first transfer switch (TX1) 714 and the second storage element 706 is selectively coupled to a second floating diffusion region (FD2) 716 through a second transfer switch (TX2) 718. The first and second floating diffusion regions 712/716 may be coupled together in one embodiment.

Figure 7B:
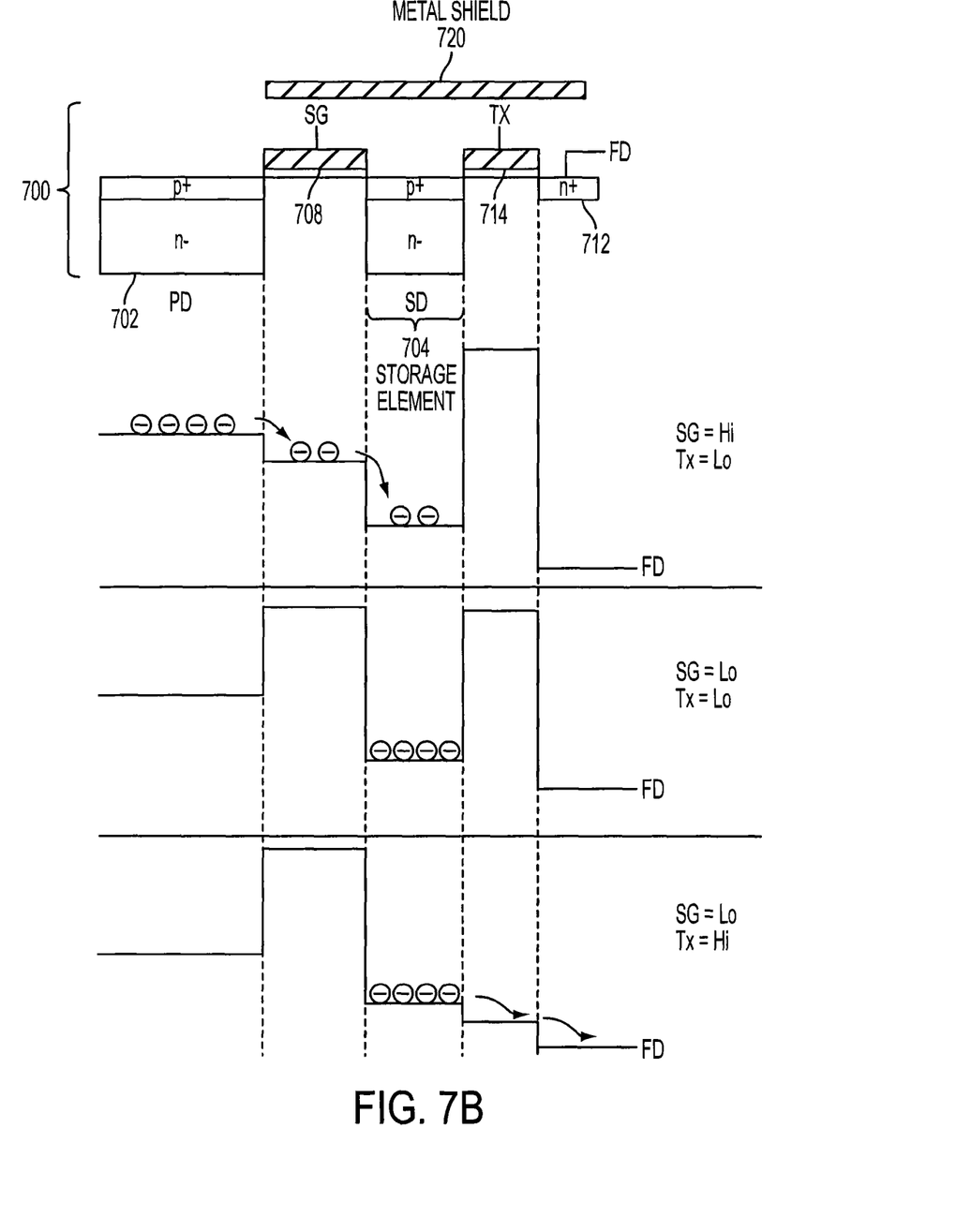
FIG. 7B is a semiconductor layer diagram and corresponding energy diagram for one storage node of a two storage node pixel in accordance with an aspect of the present invention.

FIG. 7B depicts an example of a semiconductor structure for implementing one storage element of a pixel 700 along with energy diagrams depicting the flow of electrons based on signals applied to the pixel 700, e.g., under the control of timing and control device 232 (FIG. 1). As depicted in FIG. 7B, the photodiode 702 may be fabricated as a p-n junction formed from a p+ region and an n− region within a semiconductor. The first storage element 704 may also be fabricated as a p-n junction formed from a p+ region and an n− region. A metal shield 720 is positioned over regions of the semiconductor other than the region including the photodiode 702 to prevent unwanted noise from being introduced. The first storage gate 708 and the first transfer switch 714 may be fabricated as poly-silicon or metal deposits on a dielectric layer on top of the semiconductor. The first floating diffusion region 712 may be fabricated as a n+ region.

As indicated in the corresponding energy diagrams, applying a high signal level to the storage gate 708, signal SG, and a low signal level to the transfer switch, signal TX, allows charge to flow from the photodiode 702 to the storage element 704, but prevents the flow of charge to the floating diffusion region. Applying a low signal level to the storage gate 708 and a low signal level to the transfer switch isolates the charge stored in the storage element 704. Applying a low signal level to the storage gate 708 and a high signal level to the transfer switch allows charge to flow from the storage element to the floating diffusion region, but prevents the flow of charge from the photodiode 702 to the storage element 704.

Figure 7C:
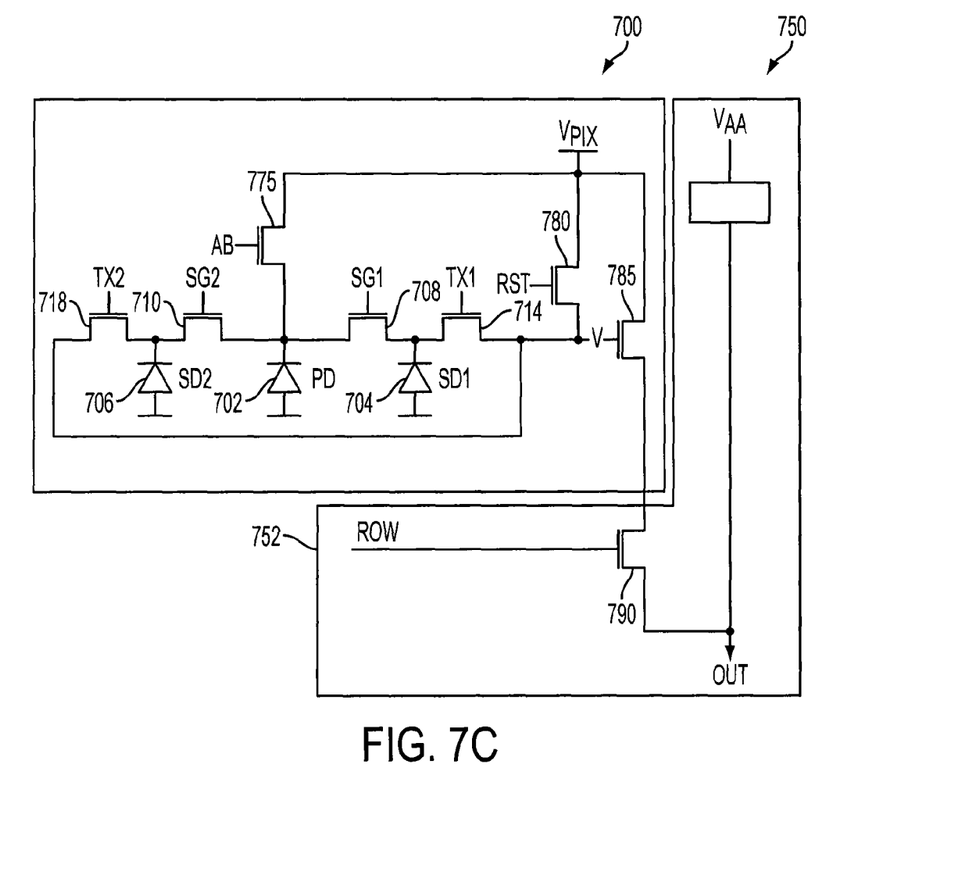
FIG. 7C is a circuit diagram of a two storage node pixel and readout circuitry in accordance with an aspect of the present invention.

FIG. 7C depicts a circuit diagram 750 implementing the pixel 700 of FIG. 7A. In addition to the pixel components discussed above, pixel 700 includes a photodiode conditioning transistor 775, a reset transistor 780, and a charge conversion transistor 785 configured as a source follower transistor.

The pixel 700 is coupled to conventional readout circuitry 752. The illustrated readout circuitry includes a row select transistor 790 and a voltage source, $V_{AA}$. The row select transistor 790 is controlled by a row signal, ROW, to produce an output signal, OUT, from a selected row.

Figure 9A:
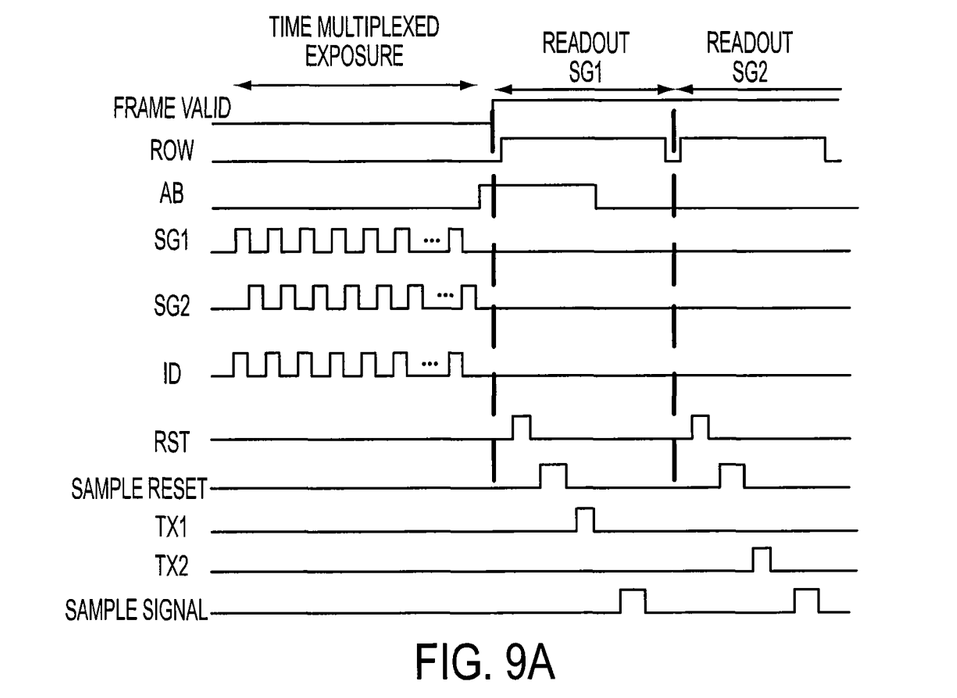
FIG. 9A is a timing diagram for the circuit FIGS. 7A and 7C.

FIG. 9A depicts a timing diagram for controlling the operation of pixel 700. The pixel 700 is synchronized to structured light pulses produced by an illumination device (e.g., to illumination device signal, ID). The first storage gate signal, SG1, is in phase with the illumination device signal, ID, and is used to control the first storage gate 708. The second storage gate signal, SG2, is 180 degrees out of phase with the illumination device signal, ID, and is used to control the second storage gate 710. The first and second storage gate signals, SG1 and SG2, cycle a plurality of times (e.g., 10 times) to accumulate charge developed by the photodiode during the illumination device pulses in the first element 704 and to accumulate charge between the illumination device pulses in the second element 706. The appropriate number of cycles is dependent on the particular system and one of skill in the art will understand how to determine the appropriate number of cycles from the description herein.

After the charge is accumulated in the first and second storage registers 704 and 706, the stored charge is read out of the storage registers and transferred to the floating diffusion regions 712/716 of the pixel during a Frame Valid period. In the illustrated embodiment, the charge is first read out of the first storage register 704 and, then, the charge is read out of the second storage register 706. Charge is read out of the first storage register by first applying a high row selection signal, ROW, to the row selection transistor 790 during the read out period, applying a reset signal, RST, pulse to the reset transistor 780 (which creates a Sample Reset pulse), and applying a transfer signal, TX1, pulse to the first transfer resistor 714. The readout circuitry 752 then reads the transferred charge during a Sample Signal period. A similar technique is applied to read out the charge stored in the second storage register.

Figure 8A:
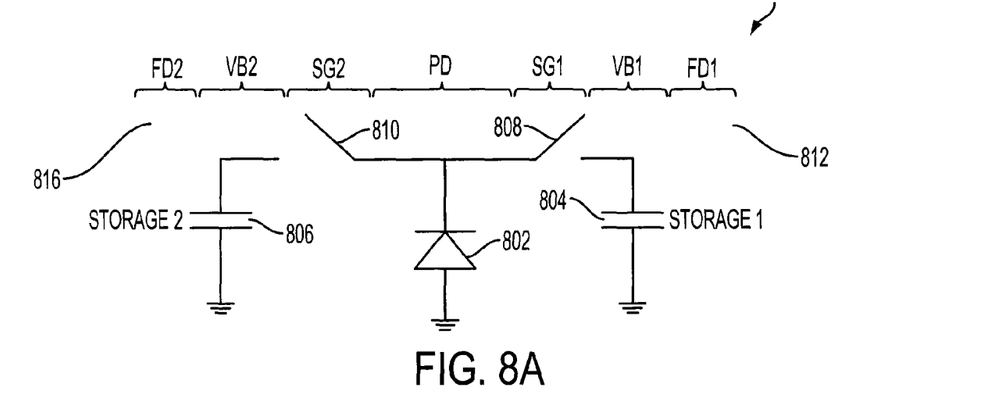
FIG. 8A is a circuit diagram of another two storage node pixel in accordance with an aspect of the present invention.

FIG. 8A depicts a conceptual circuit diagram of another pixel 800 along with descriptive regions associated with semiconductor fabrication in accordance with aspects of the present invention. The pixel 800 includes a photodiode (PD) 802. The pixel 800 also includes a first storage device/element (VB1) 804 and a second storage device/element (VB2) 806. The first storage element 804 is selectively coupled to the photodiode 802 through a first storage gate (SG1) 808 and the second storage element 806 is selectively coupled to the photodiode 802 through a second storage gate (SG2) 810. Additionally, the first storage element 804 is coupled to a first floating diffusion region (FD1) 812 through the structure of the first storage element 804 and the second storage element 806 is coupled to a second floating diffusion region (FD2) 816 through the structure of second storage element 806. The first and second floating diffusion regions 812/816 may be coupled together in one embodiment.

Figure 8B:
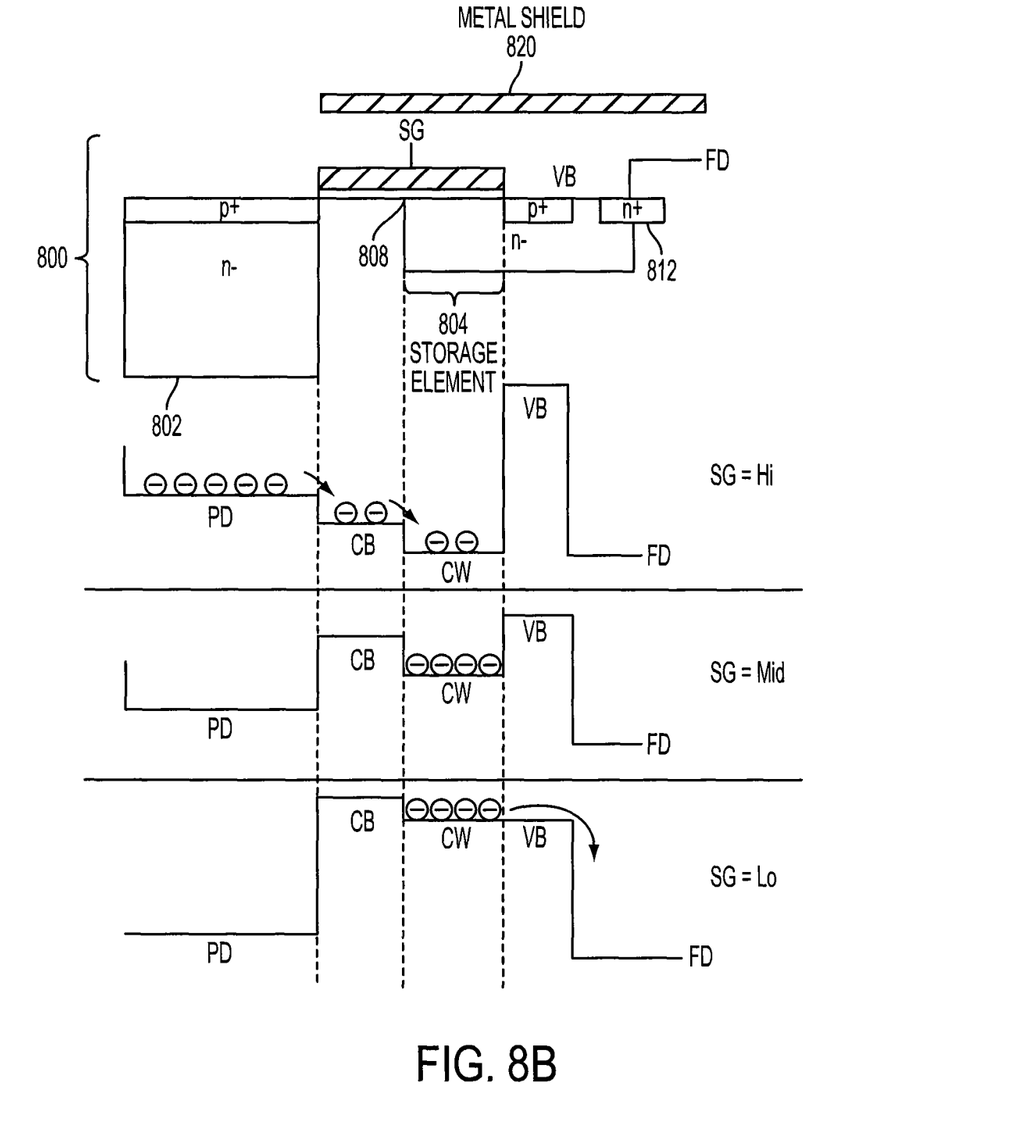
FIG. 8B is a semiconductor layer diagram and corresponding energy diagram for one storage node of another two storage node pixel in accordance with an aspect of the present invention.

FIG. 8B depicts an example of a semiconductor structure for implementing one storage element of a pixel 800 along with energy diagrams depicting the flow of electrons based on signals applied to the pixel 800, e.g., under the control of timing and control device 232 (FIG. 1). As depicted in FIG. 8B, the photodiode 802 may be fabricated as a p-n junction formed from a p+ region and an n− region within a semiconductor. The first storage element 804 may be fabricated as an n− region. A metal shield 820 is positioned over regions of the semiconductor other than the region including the photodiode 802 to prevent unwanted noise from being introduced. The first storage gate 808 may be fabricated as poly-silicon or metal deposits on a dielectric layer on top of the semiconductor. The first floating diffusion region 812 may be fabricated as a n+ region.

As indicated in the corresponding energy diagrams, applying a high signal level to the storage gate 808, signal SG, allows charge to flow from the photodiode 802 to the storage element 804, but prevents the flow of charge to the floating diffusion region. Applying a mid-level signal to the storage gate 808 isolates the charge stored in the storage element 804. Applying a low signal level to the storage gate 808 allows charge to flow from the storage element to the floating diffusion region, but prevents the flow of charge from the photodiode 802 to the storage element 804.

The pixel 800 may be implemented using a circuit diagram such as the circuit diagram 750 and readout circuitry 752 described above with reference to FIG. 7A. Suitable modifications to circuit diagram 750 and readout circuitry 752 for use with pixel 800 will be understood by one of skill in the art from the description herein.

Figure 9B:
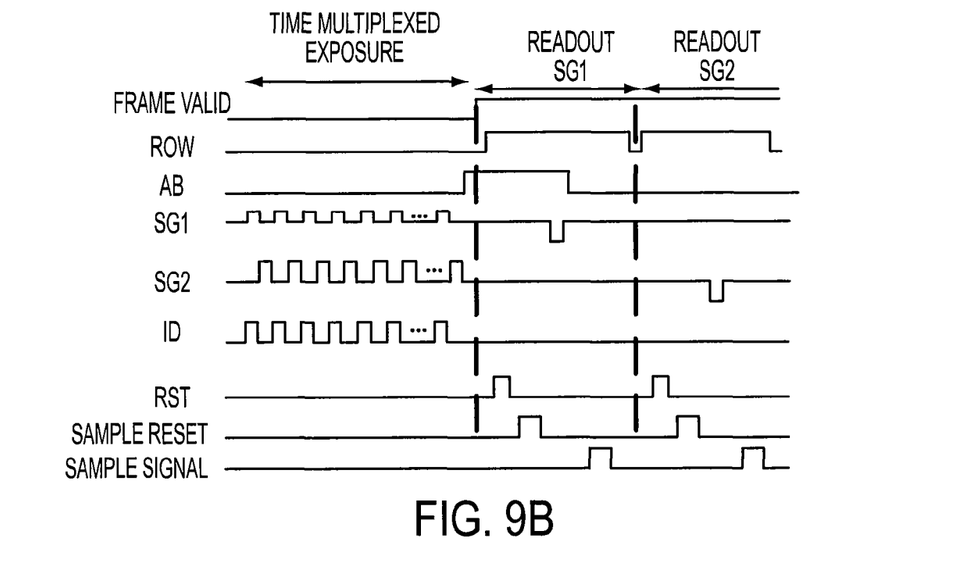
FIG. 9B is a timing diagram for the circuit of FIG. 8A implemented using a readout structure such as illustrated in FIG. 7C.

FIG. 9B depicts a timing diagram for controlling the operation of pixel 800 implemented using a suitable modified circuit diagram 750 and readout circuitry 752. The pixel 800 is synchronized to structured light pulses produced by an illumination device (e.g., to illumination device signal, ID). The first storage gate signal, SG1, is in phase with the illumination device signal, ID, and is used to control the first storage gate 808. The second storage gate signal, SG2, is 180 degrees out of phase with the illumination device signal, ID, and is used to control the second storage gate 810. The first and second storage gate signals, SG1 and SG2, cycle a plurality of times (e.g., 10 times) to accumulate charge developed by the photodiode during the illumination device pulses in the first element 804 and to accumulate charge between the illumination device pulses in the second storage registers 806. The appropriate number of cycles is dependent on the particular system and one of skill in the art will understand how to determine the appropriate number of cycles from the description herein.

After the charge is accumulated in the first and second storage registers 804 and 806, the stored charge is read out of the storage registers and transferred to the floating diffusion regions 812/816 of the pixel during a Frame Valid period. In the illustrated embodiment, the charge is first read out of the first storage register 804 and, then, the charge is read out of the second storage register 806. Charge is read out of the first storage register by first applying a high row selection signal, ROW, to the row selection transistor 790 during the read out period, applying a reset signal, RST, pulse to the reset transistor 780 (which creates a Sample Reset pulse), and then applying a low pulse to the storage signal, SG1. The readout circuitry 752 then reads the transferred charge during a Sample Signal period. A similar technique is applied to read out the charge stored in the second storage register.

Figure 10:
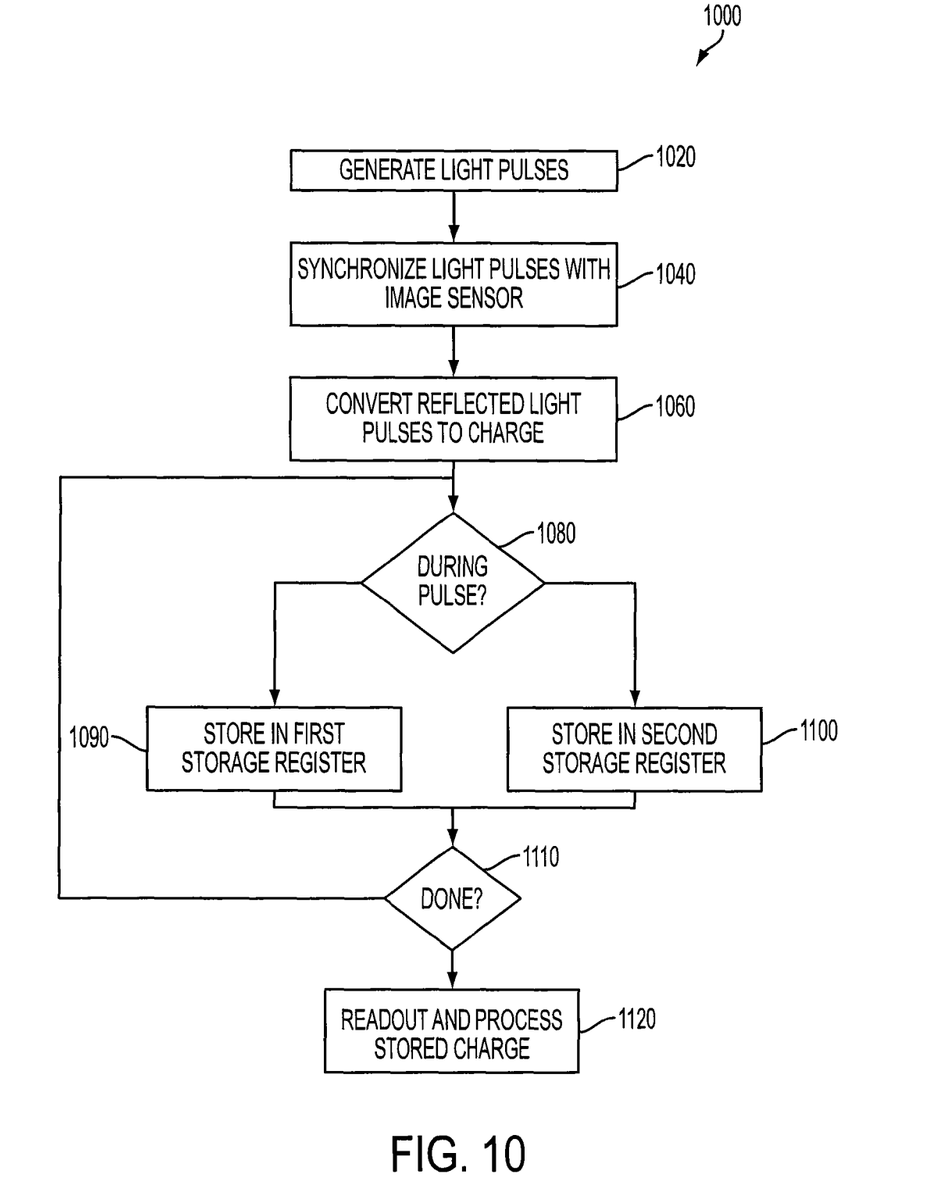
FIG. 10 is a flow chart depicting the use of a two storage node register.

FIG. 10 is a flow chart 1000 depicting steps for storing charge in accordance with one embodiment of an imaging system.

At step 1020, a stream of light pulses is generated. In one embodiment, the stream of light pulses is generated by an illumination source that generates a periodic stream of light pulses. The periodic stream of light pulses may have a rate of 5 kilo-Hertz. The stream of light pulses may be directed toward an object that is being imaged. In one embodiment, the stream of light pulses includes a single pattern of light. In other embodiments, the stream of light pulses include two or more distinct patterns. The patterns of light may include a pattern of random points or a zebra-stripe like pattern.

At step 1040, the source of the light pulses and an image sensor are synchronized. In one embodiment, the image sensor is synchronized to the illumination source using conventional techniques that will be understood by one of skill in the art from the description herein.

At step 1060, a reflection of the stream of light pulses is converted to charge. In one embodiment the stream of light pulses is reflected by an object that is being images/scanned and the reflected light is converted to charge by photodiodes within an array of pixels of the image sensor.

At step 1080, the converted charge is routed to storage elements. If the converted charge corresponds to a light pulse, processing proceeds at block 1090. If the converted charge corresponds to a period of time between light pulses, processing proceeds at block 1100. In one embodiment, the photodiode is coupled to the first storage element to transfer accumulated charge converted during the one or more pulses of light and is coupled to the second storage element to transfer accumulated charge converted between the two or more pulses of light. In another embodiment, the charge converted by the photodiode is streamed to the first storage element during conversion of the one or more pulses of light and streamed by the photodiode to the second storage element between conversion of the two or more pulses of light.

At step 1090, the converted charge corresponding to charge converted during one or more light pulses is stored in a first storage element of a pixel. At step 1100, the converted charge corresponding to charge converted between two or more light pulses is stored in a second storage element of a pixel. For example, charge converted from a first pulse may be stored to the first storage element, charge converted between the first pulse and a second pulse may be stored in a second storage element, charge converted from the second pulse may be stored to a third storage element, and charge converted between the second pulse and a third pulse may be stored to a fourth storage element.

In embodiments where each pixel includes more than two storage element, charge may be stored in different storage elements based on the pattern of the structured light and/or to enable simultaneous conversion and readout of previously converted/stored charge. For example, where the stream of light pulses includes pulse streams having different patterns (e.g., a pulse having a first pattern, another pulse having a second pattern, and another pulse having a third pattern), the storing step during the one or more pulses of light may include storing charge converted from at least one pulse having the first pattern to the first storage element, storing charge converted from at least one pulse having the second pattern to a third storage element, and storing charge converted from at least one pulse having the third pattern to a fourth storage element.

At step 1110, the system checks if additional cycles of the pulsed light are to be stored during an exposure period. If additional cycles are to be stored, processing proceeds at decision step 1080. If no more cycles are to be stored during the current exposure period, processing proceeds to step 1120.

At step 1120, charge is processed and read out of the storage elements. In an embodiment including four storage elements, charge stored in the first and second storage elements may be read out during the storage of charge in the third and/or fourth storage elements. Charge converted between light pulses may be subtracted from charge converted during light pulses. For example, the charge stored in a second storage element may be subtracted from charge stored in a first storage element, e.g., either at the pixel or column level, upon read out in the analog domain to further improve performance. In embodiments where each pixel includes additional storage element, charge in one storage element (e.g., a storage element for storing charge between light pulses may be subtracted from multiple storage elements (e.g., storage elements associated with pulses from different light patters. For example, if there are four storage elements, charge stored in a second storage element may be subtracted from the charge stored in a first storage element, the charge stored in a third storage element, and the charge stored in a fourth storage element.

Using conventional techniques that will be understood by one of skill in the art from the description herein, distance information may be obtained from the stored charge. In one example, the distortion of a projected pattern as imaged by the sensor can be used for an exact geometric reconstruction of the surface shape. By interleaving the captures of light and background frames and subtracting one from the other, the invention herein prevents degradation in depth resolution by rejecting the effects due to varying ambient illumination.

Although the invention is illustrated and described herein with reference to specific embodiments, the invention is not intended to be limited to the details shown. Rather, various modifications may be made in the details without departing from the invention.

What is claimed:

1. A structured light imaging system comprising:
an infrared light source configured to generate a stream of light pulses, wherein each of the light pulses comprises a structured light pulse that projects a known pattern of light onto an object; and an image sensor comprising:
  a photodiode that converts the stream after reflection by a scene to charge,
  a first storage element,
  a first switch coupled between the photodiode and the first storage element,
  a second storage element,
  a second switch coupled between the photodiode and the second storage element,
  a third and a fourth storage element, and
  a controller coupled to the first and second switches, the controller configured to synchronize the image sensor to the infrared light source, actuate the first switch to couple the first storage element to the photodiode to store charge converted during one or more of the light pulses, and actuate the second switch to couple the second storage element to the photodiode to store charge converted between one or more of the light pulses, wherein the controller is further configured to subtract the charge stored in the second storage element from the charge stored in the first storage element, subtract the charge stored in the second storage element from the charge stored in the third storage element, and subtract the charge stored in the second storage element from the charge stored in the fourth storage element.

2. The system of claim 1, the image sensor further comprising:
  a readout circuit coupled to the controller;
  wherein the controller is further configured to transfer charge stored in the first and second storage elements to the readout circuit.

3. The system of claim 1, the image sensor further comprising:
  a third switch coupled between the photodiode and the third storage element,
  a fourth switch coupled between the photodiode and the fourth storage element, and
  wherein the controller is further coupled to the third and fourth switches.

4. The system of claim 3, wherein the stream of light pulses includes at least one pulse having a first pattern, at least one pulse having a second pattern, and at least one pulse having a third pattern, and wherein the controller is further configured to actuate the first switch to couple the first storage element to the photodiode to store charge converted from the at least one pulse having the first pattern, actuate the third switch to couple the third storage element to the photodiode to store charge converted from the at least one pulse having the second pattern, and actuate the fourth switch to couple the fourth storage element to the photodiode to store charge converted from the at least one pulse having the third pattern.

5. The system of claim 3, wherein the stream includes a first pulse, a second pulse adjacent the first pulse, and a third pulse adjacent the second pulse and wherein the controller is further configured to actuate the first switch to couple the photodiode to the first storage element to store charge converted from the first pulse, actuate the second switch to couple the photodiode to the second storage element to store charge converted between the first and second pulses, actuate the third switch to couple the photodiode to the third storage element to store charge converted from the second pulse, and actuated the fourth switch to couple the photodiode to the fourth storage element to store charge converted between the second and third pulses.

6. The system of claim 5, further comprising:
  a readout circuit coupled to the controller and the first, second, third, and fourth storage elements,
  wherein the controller is further configured to couple the readout circuit to the first and second storage elements when the photodiode is coupled to at least one of the third and fourth storage elements.

7. An image sensor for sensing a stream of light pulses from an infrared light source as reflected by a scene, wherein each of the light pulses comprises a structured light pulse that projects a known pattern of light onto the scene, the sensor comprising:
  a plurality of pixels, each pixel comprising:
    a photodiode that converts the stream after reflection by a scene to charge;
    a first storage element;
    a first switch coupled between the photodiode and the first storage element;
    a second storage element; and
    a second switch coupled between the photodiode and the second storage element;
    a third and a fourth storage element; and
    a controller coupled to the first and second switches, the controller configured to synchronize the image sensor to the infrared light source, actuate the first switch to couple the first storage element to the photodiode to store charge converted during one or more of the light pulses, and actuate the second switch to couple the second storage element to the photodiode to store charge converted between one or more of the light pulses, wherein the controller is further configured to subtract the charge stored in the second storage element from the charge stored in the first storage element, subtract the charge stored in the second storage element from the charge stored in the third storage element, and subtract the charge stored in the second storage element from the charge stored in the fourth storage element.

8. The sensor of claim 7, each pixel further comprising:
  a readout circuit coupled to the controller;
  wherein the controller is further configured to transfer charge stored in the first and second storage elements to the readout circuit.

9. The sensor of claim 7, each pixel further comprising:
  a third switch coupled between the photodiode and the third storage element,
  a fourth switch coupled between the photodiode and the fourth storage element, and
  wherein the controller is further coupled to the third and fourth switches.

10. An imaging method comprising:
  generating a stream of light pulses, wherein the stream of light pulses projects at least two distinct patterns of structured light onto a scene;
  converting the stream after reflection by the scene to charge;
  storing charge converted during one or more of the light pulses to a first storage element;
  storing charge converted between two or more of the light pulses to a second storage element;
  subtracting the charge stored in the second storage element from the charge stored in the first storage element;
  subtracting the charge stored in the second storage element from charge stored in a third storage element; and
  subtracting the charge stored in the second storage element from charge stored in a fourth storage element.

11. The method of claim 10, wherein the generating step is performed by an illumination source and the converting and storing steps are performed by an image sensor, the method further comprising:
synchronizing the image sensor to the illumination source.

12. The method of claim 10, wherein the stream of light pulses includes at least one pulse having a first pattern, at least one pulse having a second pattern, and at least one pulse having a third pattern, the storing step during the one or more pulses of light comprising:
storing charge converted from at least one pulse having the first pattern to the first storage element;
storing charge converted from at least one pulse having the second pattern to the third storage element; and
storing charge converted from at least one pulse having the third pattern to the fourth storage element.

13. The method of claim 10, wherein the stream includes a first pulse, a second pulse adjacent the first pulse, and a third pulse adjacent the second pulse, the storing steps comprising:
storing charge converted from the first pulse to the first storage element;
storing charge converted between the first and second pulses to the second storage element;
storing charge converted from the second pulse to the third storage element; and
storing charge converted between the second and third pulses to the fourth storage element.

14. The method of claim 13, further comprising:
reading out charge from the first and second storage elements during storage of charge in at least one of the third and fourth storage elements.

15. The method of claim 10, wherein the converting step includes accumulating charge in a photodiode and wherein the method further comprises:
coupling the photodiode to the first storage element to transfer accumulated charge converted during the one or more pulses of light; and
coupling the photodiode to the second storage element to transfer accumulated charge converted between the two or more pulses of light.

16. The method of claim 10, wherein the converting step is performed using a photodiode and wherein the method further comprises:
streaming charge converted by the photodiode to the first storage element during conversion of the one or more pulses of light; and
streaming charge converted by the photodiode to the second storage element between conversion of the two or more pulses of light.

17. The structured light imaging system defined in claim 1 wherein the first, second, third, and fourth storage elements each comprise a storage element selected from the group consisting of: a storage diode and a capacitor.

* * * * *